United States Patent [19]
Lehmann et al.

[11] Patent Number: 4,611,853
[45] Date of Patent: Sep. 16, 1986

[54] ARTICULATED FITTING FOR VEHICLE SEATS

[75] Inventors: Gerhard Lehmann; Heinz-Jürgen Wagener, both of Remscheid, Fed. Rep. of Germany

[73] Assignee: Keiper Recaro GmbH & Co., Fed. Rep. of Germany

[21] Appl. No.: 562,203

[22] Filed: Dec. 16, 1983

[30] Foreign Application Priority Data

Dec. 24, 1982 [DE] Fed. Rep. of Germany ....... 3247946

[51] Int. Cl.$^4$ ............................................. B60N 1/02
[52] U.S. Cl. .................................... 297/379; 297/362; 297/367
[58] Field of Search .............. 297/362, 361, 366, 367, 297/368, 369, 370, 371, 378, 379; 16/354, 366, 333

[56] References Cited

U.S. PATENT DOCUMENTS

| 3,424,492 | 1/1969 | Tabor | 297/361 |
| 4,113,308 | 9/1978 | Werner et al. | 297/367 |
| 4,132,447 | 1/1979 | Terada | 297/367 |
| 4,290,647 | 9/1981 | Hensel et al. | 297/362 |
| 4,305,615 | 12/1981 | Osterhold | 297/362 |
| 4,358,155 | 11/1982 | Osterhold et al. | 297/379 |
| 4,402,547 | 9/1983 | Weston et al. | 297/379 |

FOREIGN PATENT DOCUMENTS

| 2645097 | 4/1977 | Fed. Rep. of Germany | 297/367 |
| 1498801 | 9/1967 | France | 297/362 |

Primary Examiner—Francis K. Zugel
Assistant Examiner—Mark W. Binder
Attorney, Agent, or Firm—Wigman & Cohen

[57] ABSTRACT

In an articulated fitting for vehicle seats, particularly motor vehicle seats, having an upper fitting element (4) to be connected with the back rest, a lower fitting element (3) to be connected with the seat portion, an intermediate element (5), which is pivotably connected both with the upper fitting element and with the lower fitting element about a hinged axis (6) and a lower-lying folding axis (13), respectively, and having an adjusting and holding device that engages the upper fitting element (4) and the intermediate element (5) for the adjustment of the angle of inclination of the back rest and the folding lock (14,17,18,20) which permits a pivoting of the upper fitting element (4) and the intermediate element (5) about the folding axis (13) only when in the opened condition, the connecting line between the pivot axis (6) and the folding axis (13) when the folding lock is closed, encompasses an angle of at most 30° with a line extending vertically downward from the pivot axis (5) in the assembled position.

7 Claims, 3 Drawing Figures

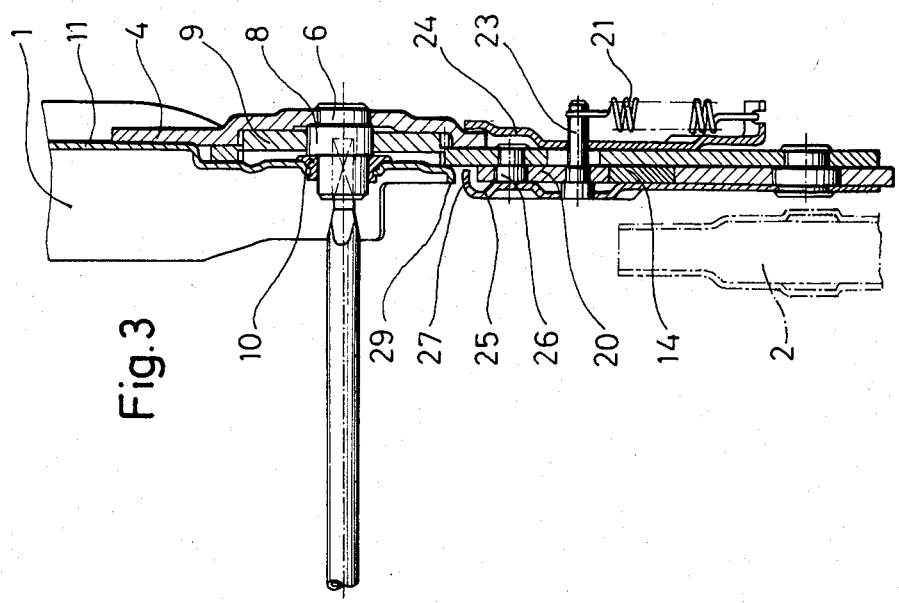
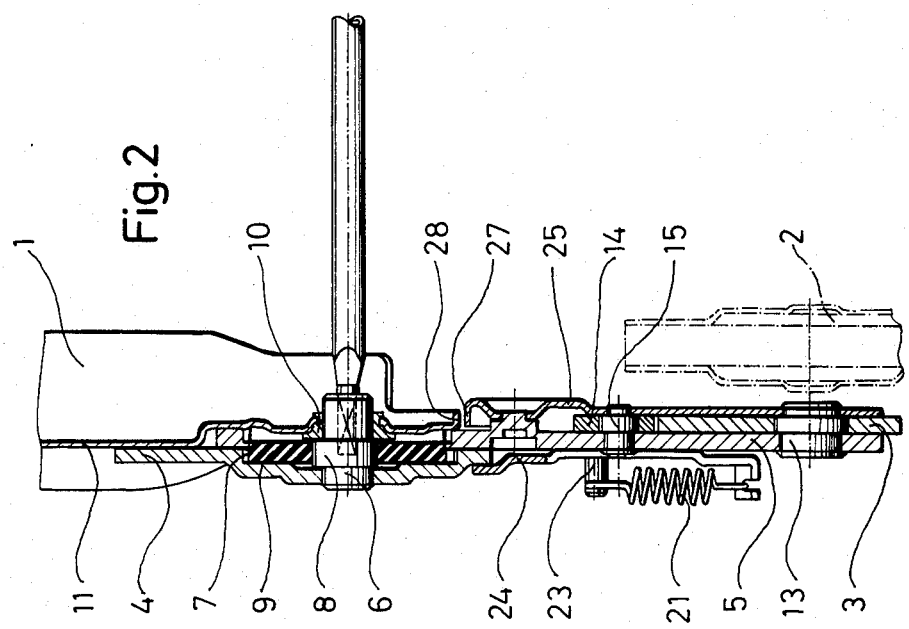

4,611,853

ARTICULATED FITTING FOR VEHICLE SEATS

BACKGROUND OF THE INVENTION

The invention relates to an articulated fitting for vehicle seats, particularly motor vehicle seats.

Normally, the articulated fittings for vehicle seats having back rests which can be both adjusted to different angles of inclination adapted to the requirements of the seat user during use of the seat and which can also be folded forward in order to facilitate access to a seat arranged behind the seat are made of two pivotally connected elements. One extends in the direction of the back rest and the other extends essentially in the direction of the associated seat portion. The latter element, which is called the lower fitting element, is hinged to the seat frame near the forward end thereof. The folding axis therefore lies farther forward than the pivot axis about which the back rest is pivoted to adjust its angle of inclination. A hook, by means of which a pin or another piece of material of the seat frame can be grasped, serves as the folding lock. If the hook is hinged to the seat frame, a pin or another piece of material of the lower fitting element serves as the folding lock. The disadvantage of these known articulated fittings is that the upper edge of the back rest first moves upward toward the vehicle roof during a folding movement, before the path of movement turns downward again. If the back rest is provided with a head rest, then at least in those situations when this head rest is adjusted to the highest possible position, it is possible that the head rest will hit the vehicle roof, thereby preventing the back rest from being folded completely forward. In most cases with these articulated fittings, one must also take care that the folding lock moves completely into the closed condition on both sides of the seat after the back rest has been folded back into the rearward end position. A further disadvantage is that with vehicle models which come in both two-door and four-door versions, the attachment of the fitting elements to the seat portion is different in the two-door version than it is in the four-door version.

An unpublished articulated fitting of the above-described type which has an intermediate element in addition to the upper and lower fitting elements, which intermediate element is pivotally connected with the upper fitting element on one side and with the lower fitting element on the other side experiences the same disadvantages.

SUMMARY AND OBJECTS OF THE PRESENT INVENTION

The object of the invention is to create an articulated fitting for vehicle seats, particularly for motor vehicle seats, which makes it possible to move the back rest not only about a pivot axis, but also about a folding axis, and yet can still be set up and used without design changes to the seat and without special measures on the part of the seat user which are required with an articulated fitting which allows only a movement of the back rest about a pivot axis.

With the position of the folding axis relative to the pivot axis in accordance with the invention, the upper edge of the back rest only slightly approaches the vehicle roof when it is folded. The seat user therefore does not need to adjust the head rest downward before folding the back rest forward, even when the head rest is adjusted to its highest position. The head rest can therefore remain in the selected position, so that the seat user does not continuously need to take care that the head rest is in a lower position.

Particularly favorable results are achieved with an angle in the range of 10° to 20° between a vertical line and a line extending from the folding axis to the pivot axis. This angle should be less than 30°.

To prevent the seat user from having to worry about the closing of the folding lock after returning the back rest to its folded-back position, in a preferred exemplary embodiment, the folding lock is formed in such a manner that it is only effective in the rear position of the folding range, and it locks automatically. This is achieved preferably by a stop which limits the rearward pivoting range of the intermediate element and by a detent pawl which automatically falls into the lock position only in this end position of the intermediate element. Advantageously, this detent pawl is provided with a segment having a plurality of teeth which engage with corresponding teeth in the lower fitting element when the lock is closed. To assure that the lock pawl cannot fall into the toothed segment of the lower fitting element until the rear end position of the intermediate element is reached, a sliding surface for the teeth of the detent pawl is provided, on which at least one of these teeth lies when the folding lock is in the open condition. Despite the use of a toothed segment, the back rest is hereby prevented from locking in an improper position.

In a preferred exemplary embodiment, the detent pawl is hinged to the intermediate element in the plane of the lower fitting element. Accordingly, the stop surface for the teeth of the detent pawl adjoins the teeth of the lower fitting element, lies in the pivot range of the teeth of the detent pawl, and is limited to the length of this tooth segment. If the intermediate element is not in the rear position, at least one of the teeth of the detent pawl lies on the stop surface. In this manner it is assured in a particularly simple manner, that the detent pawl can only fall into the toothed segment associated therewith in the rear position of the intermediate element.

Because the detent pawl moves together with the intermediate element when it is hinged therewith, it is advantageous to provide the stop for limiting the pivot range of the intermediate element to the rear on the lower fitting element in the path of movement of the detent pawl. Advantageously, this stop is formed in one piece with the lower fitting element.

In order to not have to lift the detent pawl out of the locking position in order to release the folding lock, the teeth of the detent pawl, as well as the teeth associated therewith, can be provided with a non-self-arresting shape. In order to reliably prevent an unintentional release of the folding lock as a result of a load placed on the back rest, a latch is provided, preferably in the pivot range of the detent pawl, which form-fittingly holds the detent pawl in the locked position when in its locking position. This latch can be hinged to the intermediate element.

In addition, the lower fitting element preferably has connection points for the connection with the seat portion in an identical arrangement as the lower fitting element for seats in a four-door vehicle having a back rest that is movable about only one pivot axis. This is possible, because the lower fitting element need not perform any movement relative to the seat frame. The articulated fitting according to the invention therefore permits a seat to be equipped selectively with an articulated fitting which permits only one pivot movement of the back rest or with the articulated fitting according to the invention, without design changes to the seat and without having to perform the assembly in a different manner.

With the foregoing and other objects, advantages and features of the invention that will become hereinafter apparent, the nature of the invention may be more clearly understood by reference to the following detailed description of the invention, the appended claims and to the several views illustrated in the attached drawings.

BRIEF DESCRIPTION OF THE DRAWINGS

FIG. 2 is a cross-section according to line II—II in FIG. 1; and

FIG. 3 is a cross-section according to line III—III in FIG. 2.

DETAILED DESCRIPTION OF A PREFERRED EMBODIMENT

Figure 1:
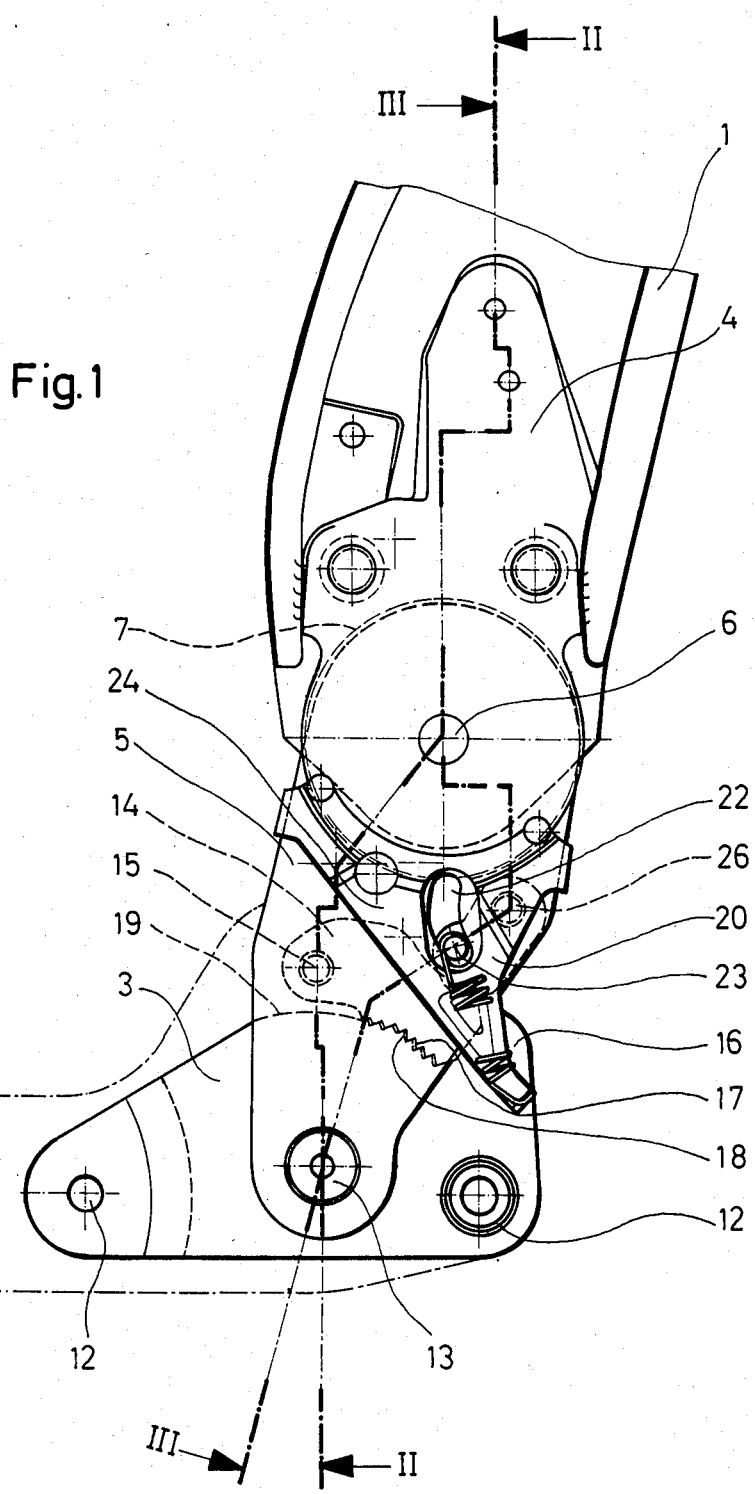
FIG. 1 is a side view of the preferred embodiment.

An articulated fitting to connect the partially illustrated back rest 1 with the frame 2 on an otherwise not shown seat portion of a motor vehicle seat includes a lower fitting element 3 to be rigidly connected with the frame 2, an upper fitting element 4 to be rigidly connected with the upholstery support of the back rest 1 and an intermediate element 5. The intermediate element 5, which, like the upper fitting element 4 and the lower fitting element 3, is stamped from sheet steel, and forms a connecting bar between the two fitting elements 3 and 4. Intermediate element 5 is pivotally connected with the lower end section of the upper fitting element 4 in the vicinity of its own upper end section by means of a pivot axis 6.

In order to be able to pivot the upper fitting element 4, and thereby also pivot the back rest 1, about the pivot axis 6, and to hold the same in selectable pivot positions, an adjusting and holding device engages both the upper fitting element 4 and the intermediate element 5. This device is formed in the preferred embodiment as a self-arresting turning mechanism. As shown in FIGS. 2 and 3, the central gear 7, which is formed in one piece with the upper fitting element 4, is arranged concentrically to the bore of the upper fitting element 4 and serves as a mount for the pivot axis 6. The planetary gear 9 is rotatably arranged on a cam 8 and is formed in one piece with and is pressed half-way out of the intermediate element 5. A mounting bushing 10, which is inserted into a punched out opening in a cover plate 11 and is rigidly connected therewith, serves as a second mounting point for the pivot axis 6. This cover plate 11, which is welded with the upper end of the upper fitting element 4, secures the pivot axis 6 against axial shifting and holds the planetary gear 9 in engagement with the central gear 7.

The drive of the pivot axis 6 for purposes of changing the angle of inclination of the back rest takes place with the aid of a drive mechanism (not shown), which is preferably a hand wheel or a drive motor. With this drive mechanism, the pivot axis 6 of the articulated fitting provided on one side of the seat and the pivot axis of the mirror-image articulated fitting provided on the other side of the seat are simultaneously rotated the same amount.

The lower fitting element 3 is provided with circular punched out openings 12 for the penetration and engagement of connecting means, such as screws, by means of which the lower fitting element is attached to the frame 2 of the seat portion. Since the lower fitting element 3 is connected with the frame 2 in the same manner as the lower fitting element of an articulated fitting such as is used for seats of four-door vehicles, in which it is not necessary to be able to fold the back rest forward to facilitate entry, the arrangement of the punched out openings 12 is adapted to the position of the connecting points for a fitting without a folding axis. Depending on the selection of the articulated fitting, therefore, the seat portion and the back rest can be provided with the fitting according to the invention or a fitting without a folding axis, without design changes.

The lower end of the intermediate element 5 is pivotably connected with the lower fitting element 3 by means of a folding axis 13, which lies parallel to the pivot axis 6. As shown in FIG. 1, the folding axis 13 penetrates the rear half of the lower fitting element 3. This results in a position of the folding axis 13 relative to the pivot axis 6 such that when the intermediate element 5 is located at the rear end of its pivot range relative to the lower fitting element, the connecting line between the pivot axis 6 and the folding axis 13, extends along a line coming vertically downward toward the lower fitting element 3 at an angle of about 15°. In other words, with a folding movement of the intermediate element 5 forward from the rear position, illustrated in FIG. 1, the pivot axis 6 is located vertically above the folding axis 13 after a pivot movement of 15°. The upper edge of the back rest 1 and a head rest which is also supported by the back rest therefore only slightly approach the roof of the vehicle during this forward folding movement because of the relatively small size of the above-mentioned angle. Therefore, even in the position where the pivot axis 6 is located vertically above the folding axis 13, a head rest does not come into contact with the vehicle roof, even when it is adjusted to the maximum possible height. The back rest can therefore be folded into the forward position without hinderance.

In order to lock the intermediate element 5 with the lower fitting element in the rear position of its pivot range, a folding lock is provided which has a detent pawl 14. This detent pawl 14, which is formed as a stamped element, lies on the inner side of the intermediate element 5 above the lower fitting element 3 and is here hinged to a pin 15 on the intermediate element 5, which pin lies parallel to the pivot axis 6 and the folding axis 13. As shown in FIG. 2, it therefore lies in the plane defined by the lower fitting element 3 and extends, as FIG. 1 shows, downward from the pin 15. A stop 16, which is formed in one piece with the lower fitting element 3 and projects upward, is provided at the rearwardly directed free end of the detent pawl 14. The forwardly directed side of this stop 16 lies against the rearwardly directed free end of the detent pawl 14 when the intermediate element 5 is located at the rear end of its pivot range. The stop 16, in other words, limits the pivot range of the intermediate element 5 to the rear in a form-fitting manner.

The edge of the detent pawl 14 directed toward the lower fitting element 3 is provided over a portion of its length with a toothed segment 17 consisting of a plurality of teeth. This toothed segment 17 extends in the preferred embodiment to the rearwardly directed free end of the detent pawl 14.

The upper edge of the lower fitting element 3 connected to the stop 16 is provided with a corresponding toothed segment 18, the length of which is equal to the length of the toothed segment 17. A sliding surface 19 formed on the upper edge adjoins the end of the toothed segment 18 opposite the stop 16, at the level of the tooth tips of the toothed segment 18. The toothed segment 17 of the detent pawl 14 can therefore engage in the toothed segment 18 only in the rear end position of the intermediate element. If the intermediate element 5 is pivoted forward out of this end position, then at least one tooth of the toothed segment 17 lies on the slide surface 19 and prevents the engagement in the toothed segment 18.

The shape of the teeth of the two toothed segments 17 and 18 is not self-arresting. In other words, the teeth of the toothed segment 17 are lifted out of the toothed segment 18, when a force such as a pivoting about the folding axis 13 relative to the lower fitting element is exerted on the intermediate element 5.

In order to still be able to hold the detent pawl 14 in the locking position, in which the toothed segments 17 and 18 are in engagement, the folding lock has a latch 20, which is formed as a stamped element and is hinged to the intermediate element 5 on the inner side thereof above the detent pawl 14, but lying within the pivot range thereof. A prebiased helical spring 21 tends to hold the latch 20, which abuts the upwardly directed edge of the detent pawl 14, in a position such that a force exerted on the detent pawl 14 by the toothed segments 17 and 18 cannot move it. This dead center and top dead center position of the latch 20 are defined by one end of a slot 22 in the intermediate element 5, which is penetrated by a pin 23 projecting from the latch 20. The prebiased helical spring 21 is connected to this pin 23.

In order to fold the back rest 1 forward, the latch 20 must first be pivoted into its release position, which when viewed in accordance with FIG. 1, means a pivot movement in the clockwise direction. This pivot movement, against the force of the helical spring 21, is effected by means of an activating device (not shown), which, for example, can consist of a handle projecting from the side of the back rest which is connected with the latch 20 or the pin 23 with a cable. If, thereafter, a force in the sense of a forward folding is exerted on the back rest 1, then the teeth of the toothed segment 17 come out of engagement with the toothed segment 18 and eventually come into contact with the slide surface 19. If the back rest 1 is subsequently folded back, then this folding movement is limited by the fact that the detent pawl 14 comes into contact with the stop 16. Only when this rear position is reached have all teeth of the toothed segment 17 left the slide surface 19. The detent pawl 14 cannot fall into its locking position under the force exerted on it by the spring-biased latch 20, until the toothed segment 17 is in engagement with the toothed segment 18. If at first the folding lock is only effective in the fitting provided on one side of the seat, then it is forced to be effective in the fitting on the other side as well, as soon as the seat user leans against the back rest and thereby loads same toward the rear.

As shown particularly in FIGS. 2 and 3, one end of the helical spring 21 is connected to the pin 23, and the other end is connected to an outwardly bent portion of a plate 24, which abuts portions of the outside of the center element 5 and is rigidly connected therewith. The upper edge strip of this plate 24 overlaps the lower edge zone of the upper fitting element 4 and thereby assists in holding the intermediate element 5 and the upper fitting element 4 in contact with each other.

In the preferred embodiment a second cover plate 25 abuts the side of the lower fitting element 3 opposite the intermediate element 5. This cover plate 25 is held by the folding axis 13, by the pin 15 of the detent pawl, as well as by the mounting pin 26 of the latch 20. In addition, as shown in FIG. 2, the cover plate 25 is riveted together with the intermediate element 5 above the pin 15. The upper edge of the second cover plate 25, except for a central section, is inclined toward the intermediate element 5, as shown in FIG. 2. These two inclined edge zones each form a stop 27 for the lower edge area of the first cover plate 11. The lower edge area is also inclined, at the respective ends of the pivot range of the upper fitting element 4 relative to the intermediate element 5. The surface areas of the first cover plate 11 which come into contact with the stops 27 in the two end positions of the upper fitting element 4, are designated with the reference numerals 28 and 29, respectively.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. An articulated fitting for vehicle seats, particularly motor vehicle seats, comprising:
   an upper fitting element to be connected with a back rest;
   a lower fitting element to be connected with a seat portion;
   and an intermediate element pivotably connected both with the upper fitting element and with the lower fitting element about a pivot axis and a lower-lying folding axis spaced apart from said pivot axis, respectively, said lower fitting element having a toothed surface and a slide surface;
   an adjusting and holding device that engages the upper fitting element and the intermediate element for the adjustment of the angle of inclination of the back rest; and
   a folding lock which permits a pivoting of the upper fitting element and the intermediate element about the folding axis only when in the unlocked condition;
   wherein said pivot axis and said folding axis are located, when the folding lock is locked, such that a line between the pivot axis and the folding axis subtends an angle of no more than 30 degrees with a line extending vertically downward in the assembled position of the pivot axis; and
   wherein a stop is provided which limits the pivot range of the intermediate element toward the rear, and the folding lock includes a detent pawl which automatically falls into a locking position only in the rear position of the intermediate row of teeth, said segment engaging with the toothed surface of the lower fitting element when the lock is locked and at least one of the teeth of the first toothed segment lies on the slide surface of the lower fitting element when the folding lock is unlocked;
   whereby when the seat is folded forward, the arrangement of the folding and pivoting axes precludes the seat from interfering with the roof of the vehicle.

2. The articulated fitting according to claim 1, wherein the angle lies in the range between 10° and 20°.

3. The articulated fitting according to claim 2, wherein the detent pawl lying in the plane of the lower fitting element against the intermediate element is hinged, and the slide surface adjoins the corresponding toothed segment which lies in the pivot range of the first toothed segment of the detent pawl and is restricted to the length of the first toothed segment.

4. The articulated fitting according to claim 2, wherein the stop for limiting the pivot range of the intermediate element towards the rear is provided on the lower fitting element in the path of movement of the detent pawl.

5. The articulated fitting according to claim 2, wherein the first toothed segment of the detent pawl and the corresponding toothed segment have a non-self-arresting tooth shape; and a latch lies in the pivot range of the detent pawl, said latch form-fitting holds the detent pawl in the locking position, when the latch is in the lock position.

6. The articulated fitting according to claim 5, wherein the latch is hinged to the intermediate element.

7. The articulated fitting according to claim 1, wherein the lower fitting element has openings for the connection with the seat portion in the same arrangement as the lower fitting element for seats of a four-door vehicle having a back rest which is only movable about a pivot axis.

* * * * *